DEVICE FOR IDENTIFICATION OF ENGRAVED DOCUMENTS

Filed April 26, 1957 2 Sheets-Sheet 1

INVENTOR
PAUL J. SELGIN
BY Max L. Libman
ATTORNEY

Dec. 13, 1960 P. J. SELGIN 2,964,641

DEVICE FOR IDENTIFICATION OF ENGRAVED DOCUMENTS

Filed April 26, 1957 2 Sheets-Sheet 2

INVENTOR
PAUL J. SELGIN

BY Max L. Libman

ATTORNEY 2,964,641
Patented Dec. 13, 1960

2,964,641

DEVICE FOR IDENTIFICATION OF ENGRAVED DOCUMENTS

Paul J. Selgin, 5310 Reno Road NW., Washington, D.C.

Filed Apr. 26, 1957, Ser. No. 655,266
6 Claims. (Cl. 250—219)

This invention relates to the identification of documents and more particularly to the identification of engravings or other prints in which a pictorial representation is produced by a number of fine lines of varying configuration, and has for its primary object the provision of novel means for automatically identifying a particular document so engraved.

An important object of the invention is the identification of paper currency, which typically contains substantial areas of such fine engraved lines.

My prior U.S. Patent No. 2,646,717 discloses an apparatus for identifying documents such as paper currency by the comparison of such documents with an authentic copy of the same or an identical reproduction thereof, by optical superposition of a positive and a negative image which are oscillated with respect to each other so as to insure substantial coincidence of the images periodically. By means of a photoelectric system an electric signal is produced at the frequency of oscillation in a particular direction, and a tuned electric circuit is employed to detect the periodic signal.

The present invention constitutes an improvement over the disclosure of my prior patent and takes advantage of the multiplicity of fine lines of which an engraving or similar print is formed to produce a more distinctive frequency effect uniquely related to a particular document to be identified; and does not require an actual copy or negative of the document, but instead employs a master reference optical matrix which is uniquely related to a document sought to be identified.

A major object of the invention is the provision of an identification device for the recognition and authentification of genuine paper currency for automatic vending and other purposes.

Another object is the provision of relatively simple means for document identification which does not require the entire document to be inspected but inspects instead a selected area or selected areas of the document to produce a reliable indication of authenticity.

According to the invention, an image of at least a portion of the engraved pattern is superimposed on a surface bearing an optical representation of the spaces between the lines forming said image, but not necessarily an exact optical representation of said spaces.

The variations in light produced by moving these images relative to each other are photoelectrically transformed into electric signals and these signals are detected by means of a tuned circuit, and may be used to actuate an indicating device, a vending device, etc., as desired.

The specific nature of my invention as well as other objects and advantages thereof will clearly appear from a description of a preferred embodiment as shown in the accompanying drawings, in which.

Figure 1:
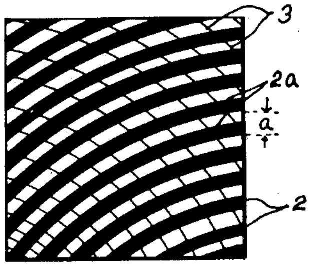
Fig. 1 is a representation of a portion of an engraving on an enlarged scale.

The invention utilizes an optical system which projects an enlarged image of a small portion of the engraved pattern upon a screen. This image will have the appearance of a series or family of approximately parallel lines. In general these will be curved and of uneven thickness, and there may be a cross-hatching due to the presence of a secondary series of lines crossing the first. Such an image is shown for the sake of example in Fig. 1, in which the curved major lines of the engraving are represented at 2 and the secondary series of lines is represented at 3. Considering the particular pair of lines identified by the reference character 2*a*, it will be noted that the spacing between these two is designated as "*a*."

Figure 2:
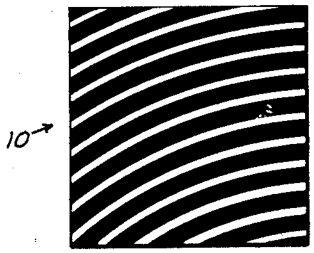
Fig. 2 is a representation of the matrix used to identify the engraving of Fig. 1.
Figure 5:
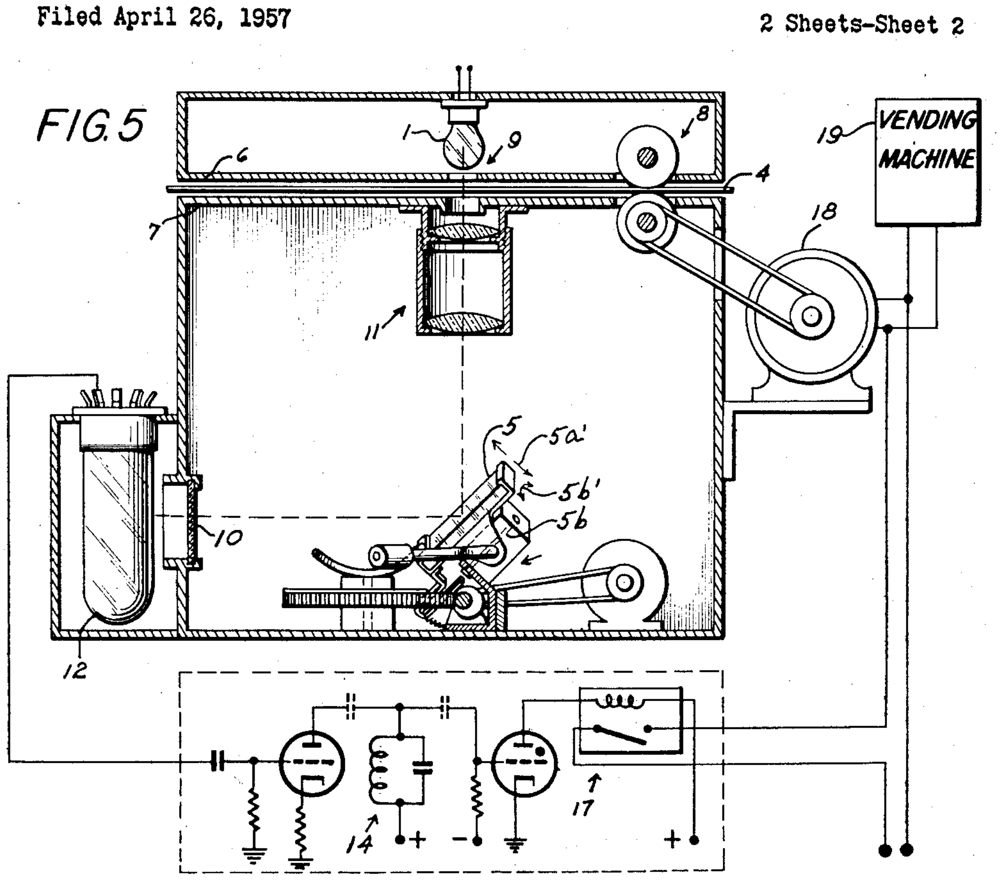
Fig. 5 is a schematic diagram of the structure and circuitry embodied in one form of the invention.

Referring to Fig. 5, the document which is to be identified is shown at 4 as positioned between two plates 6 and 7, which are spaced sufficiently close together to maintain the document reasonably flat, and is held pinched between two rollers 8, between which it has been positioned by means forming no part of the present invention. The plates 6 and 7 are opaque except in the area generally designated by the reference character 9, where an aperture is provided whereby the light from electric lamp 1 can shine directly through the relatively thin paper on which the engraving is printed whereby an image may be projected through lens system 11 which is reflected by means of mirror 5 through a template 10 onto photocell 9. The template 10 bears upon its surface a transparent or translucent sheet or plate on which are drawn opaque lines or bands in such a manner that they completely cover the illuminated areas between the lines 2 of Fig. 2. Fig. 2 is a representation of a template corresponding to the engraved area shown in Fig. 1. In Fig. 2 the light bands 2*a'* correspond generally to the dark bands 2*a* of Fig. 1, except that they are narrower. The dark bands in Fig. 2 correspond to the spaces of Fig. 1, except that they are wider. It will thus be apparent that the lines of the template are essentially parallel to the image lines of Fig. 1 and have no relaion to the secondary cross-hatching lines 3, if such exist in this portion of the engraving. The latter lines are non-essential to the operation of the device. It will be noted that the template of Fig. 2 in no way consitutes a reproduction, even partial, of the original. Template bands alternate with image lines and do not coincide therewith. Their thickness is not necessarily the thickness of spaces between the image lines but is preferably greater, and cross-hatching, if it exists, is ignored. Hence, the template is not a true negative, but instead is a geometric striation bearing a unique relationship to the original image.

Figure 3:
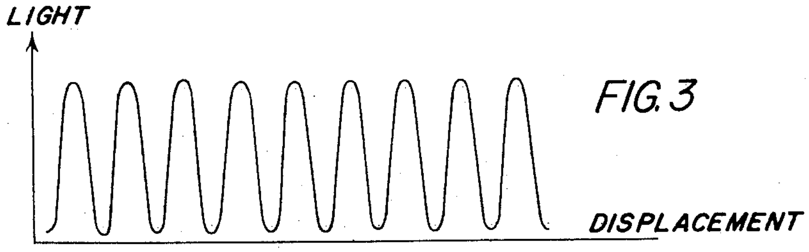
Fig. 3 is a schematic graph used to explain the principles of the invention.

The principle of operation will now be explained before considering the actual operation of the device. It will be assumed that the template of Fig. 2 is superimposed upon the image of Fig. 1 (or vice versa), and that they are moved relatively to each other, for example, in the "vertical" direction (up or down). To simplify the reasoning, we will initially assume that lines of the image and also those of the template are exactly parallel to one another, although not necessarily straight. The light transmitted through or reflected from the screen will be completely cut off every time that the bands of the template fall upon the spaces of the image. This condition which we will call "total darkness" will therefore occur repeatedly at a definite rate or frequency, which depends upon the vertical motion velocity, and the pitch of the lines. If the amount of transmitted (or reflected) light is plotted against vertical displacement, a plot similar to Fig. 3 will result, under the assumed conditions of perfect parallelism.

Figure 4:
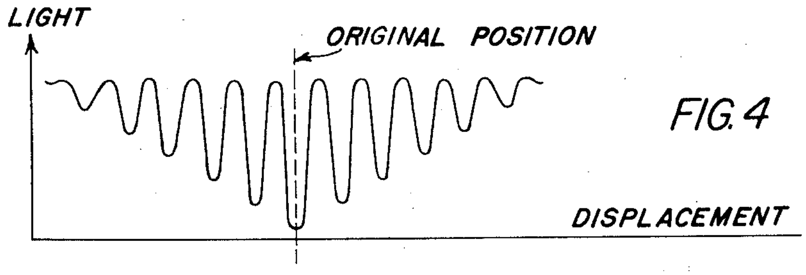
Fig. 4 is a graphic representation of the signal output typically obtained according to the invention.

Now consider what happens if the lines are not exactly parallel but only approximately so, i.e., when the image of Fig. 2 is displaced laterally from that of Fig. 1, and is then again moved vertically as before. In this case, total darkness is only obtained in the original position in which the two images exactly match. Vertical motion will no longer reproduce perfect coverage of illuminated areas by the template lines, since this is possible only in the original position and on the average, more and more light will be transmitted as the lateral distance from the original position is increased. When the displacement has proceeded far enough so that the relationship of the two images is purely random, then a certain average amount of light will be transmitted from any super-imposed relative position of the two images. A plot of transmitted light in this case will therefore have the appearance of Fig. 4, which covers displacements on both sides of the original position.

Figure 8:
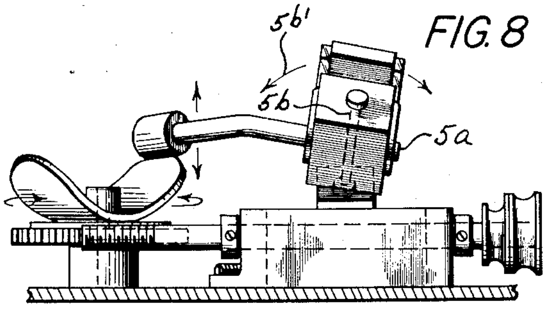

Referring to Figs. 5 and 8, it will be seen that means have been provided for superimposing the original image on the template, and that it is now necessary to provide also means for producing the desired relative motion. This is accomplished by means of mechanism for oscillating mirror 5 simultaneously in two directions so as to produce a "fast" oscillation around an axis 5*a* (Fig. 8) perpendicular to the drawing as indicated by the arcuate arrow 5*a'* (Fig. 5) and a "slow" oscillation around an axis 5*b* parallel to the drawing as indicated by the arrow 5*b'* in Fig. 8. The amplitude of these oscillations should be made sufficient to insure that at some point during the slow oscillation cycle, perfect superposition of the two images will occur. This therefore requires that the amplitude of the oscillations cover or exceed any possible inaccuracy in positioning the document 4 so as to insure that at some point in the resultant motion the necessary alignment of the two images is obtained. Any suitable mechanism for producing the necessary oscillatory motion is provided, as is schematically indicated at 21.

For example, a motor 22 drives shaft 23 through belt 24. Rotation of this shaft causes a slow rotation of cam disk 26 through worm gear 27 (Fig. 8). At the same time, a cam 28 oscillates mirror 5 rapidly about axis 5*a* by means of cam follower 29 and return spring 31. Arm 32 passes through axis 5*a* and is bent at a slight angle as shown; this arm terminates in a cam follower 33 which is also urged against cam disk 26 by return spring 31; this spring is mounted at such an angle that a different component of its bias force urges cam followers 33 and 29 against their respective cams. Rotation of cam disk 26 causes mirror 5 to oscillate about its other axis 5*b*, as will be apparent from Fig. 8. Thus there is a slow sweep of the mirror about axis 5*b* while it is oscillating rapidly about axis 5*a*, and the composite effect is to produce a total scan of an area in which the point of coincidence of image and mask is certain to lie.

Figure 6:
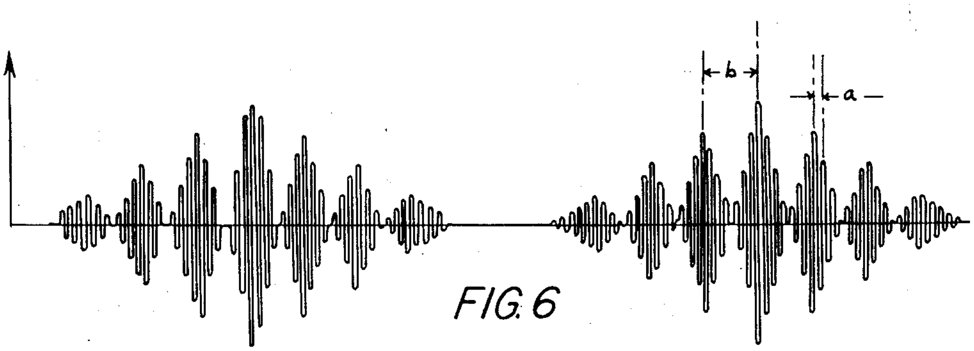
Fig. 6 is a graph showing a typical group of recognition signals produced when an engraving is identified.
Figure 7:
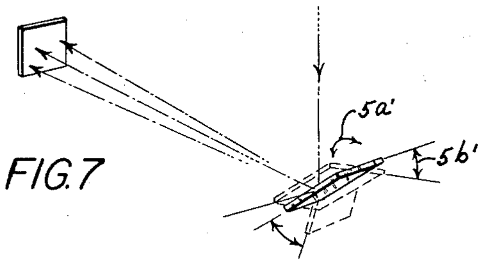

A phototube or photocell 12 is placed behind the template 5. The electrical output of the phototube will go through variations similar to those shown in Fig. 4 every time the combined oscillation sweeps the image through a position of "total darkness" or coincidence, which is identical to the position in which the template lines were drawn in the first place. Due to the presence of both slow and fast oscillation the actual signal output of the phototube will have the form shown in Fig. 6; there will be times, due to the slow oscillation when there will be no condition of total darkness at all during the entire fast oscillation cycles, and at other times total darkness will only be approached. The waveform shown in Fig. 6 extends above and below the zero axis (unlike Fig. 4) because of passage through the A.-C. amplifier. It will be noted in Fig. 6 that the intervals between groups of fast pulses are shown at *b*, while the finer oscillations produced by the "fast" frequency are shown at *a*. A tuned circuit 14 is provided which is tuned to the frequency of the "fast" oscillations representing the highest-frequency component "*a*" of the complex oscillation of Fig. 6. This is the frequency determined by the pitch of the lines 2 in Fig. 1 and by the image velocity at the time of total or almost total coincidence. This frequency does not appear as a sustained oscillation, but is characterized by successive "bursts" as shown in Fig. 6; the tuned circuit 14 has characteristics analogous to those of a sound board or resonant chamber used in building up the sound from a percussion or string instrument, and as a result the output of the amplifier will build up to a high signal of some duration containing this high-frequency component in almost pure form. The peculiar form of the "burst" in the input signal of Fig. 6 is such as to provide a high degree of excitation to the resonant circuit. This excitation is completely absent or very much reduced, if the pitch of the lines differs from the correct value by even a small amount, and, of course, it is also absent if the slope or curvature of said lines differs from those of the original. Therefore, the document will give rise to a higher amplifier output only if the fine engraving is accurate in every detail, at least over the area projected. Since a would-be imitator has no way of knowing which area is being projected, the entire engraved surface would have to be simulated to a high degree of accuracy for the document to pass the test.

When the amplifier circuit signal reaches a high level due to the resonance of tuned circuit 14, as explained, a thyratron is triggered, which in turn energizes a relay 17 to operate the motor 18. This motor feeds the document through a set of rollers into a suitable compartment of the machine. At the same time, a vending machine 19 dispenses merchandise or any other desired item. In the event that the document does not pass the test, suitable means may be provided for rejecting it, but such means are well known in vending machines and form no part of the present invention.

While the present arrangement shows a means for comparing the images by transmitting light through the document itself, it will be apparent that reflected light from one surface of the document could equally well be employed, and also that negative images could be employed instead of positive images, etc. It will also be apparent that different means for oscillating the images relative to each other may be employed, such as actual physical oscillation of one or both of the two images to be superimposed or of the plate 5 bearing the matrix.

It will be apparent that the embodiments shown are only exemplary and that various modifications can be made in construction and arrangement within the scope of my invention as defined in the appended claims.

I claim:

1. Apparatus for identification of engravings, said engravings comprising a surface bearing a plurality of spaced, approximately parallel lines of a particular unique configuration and of substantial width, separated by spaces of different reflectance from said lines, said apparatus comprising a complementary surface bearing lines corresponding in configuration to the spaces of said first surface but of greater width, means for optically superimposing said two surfaces to produce a uniform optical effect over the combined surfaces when the two sets of lines are complementary and positionally matched, shifter means for shifting said surfaces with respect to each other in a first direction substantially perpendicular to at least some of said lines to produce a variation in the combined optical effect at a particular frequency determined by the distance between said lines and the speed of said shifting, photoelectric means responsive to said variations in optical effect to produce electrical signals at said particular frequency of occurrence corresponding to said variations, circuit means responsive to said signals, and tuned to said frequency to produce a control signal at a predetermined amplitude of said signal frequency.

2. The invention according to claim 1, said shifter means comprising means for oscillating said surfaces with respect to each other at a first frequency.

3. The invention according to claim 2, said shifter means comprising further means for shifting said superposed surfaces in a second direction in an oscillatory manner at a slower frequency than said first frequency.

4. Apparatus for identification of documents having a plurality of equally spaced approximately parallel lines of a particular unique configuration and of substantial width separated by spaces of different reflectance from said lines comprising; a mask including a complementary surface having only a plurality of equally spaced lines corresponding to the configuration of said spaces between the lines of said documents; means for optically superimposing an image of said parallel lines upon the lines of said mask; shifter means for shifting said image with respect to said mask in a first direction perpendicular to at least some of said lines for a distance which is equal to the width of a plurality of said lines to produce a variation in the combined optical effect at a particular frequency determined by the distance between the lines and the speed of said shifting, photoelectric transducer means positioned adjacent to said mask and responsive to the variations of illumination to produce electrical signals at said particular frequency of occurrence; circuit components responsive to said electrical signals and adjusted to resonance at said frequency to produce a control signal at a predetermined amplitude; and electrical means for sensing the amplitude and frequency of said control signals.

5. Apparatus for identification of documents as set forth in claim 4 wherein said parallel lines are straight.

6. Apparatus for identification of documents as set forth in claim 5 wherein said shifter means includes an oscillating mirror as part of said optical system, said direction of oscillation being substantially at right angles to said straight lines.

References Cited in the file of this patent

UNITED STATES PATENTS

| | | |
|---|---|---|
| 2,375,665 | Koulicovitch | May 8, 1945 |
| 2,552,156 | De France | May 8, 1951 |
| 2,646,717 | Selgin | July 28, 1953 |
| 2,712,640 | Mork et al. | July 5, 1955 |
| 2,731,621 | Somtheimer | Jan. 17, 1956 |
| 2,827,822 | Timms | Mar. 25, 1958 |
| 2,922,893 | Ett | Jan. 26, 1960 |